Jan. 25, 1949. W. C. ALVIN 2,459,910
METHOD OF MAKING TOOL PARTS
Filed Feb. 23, 1946
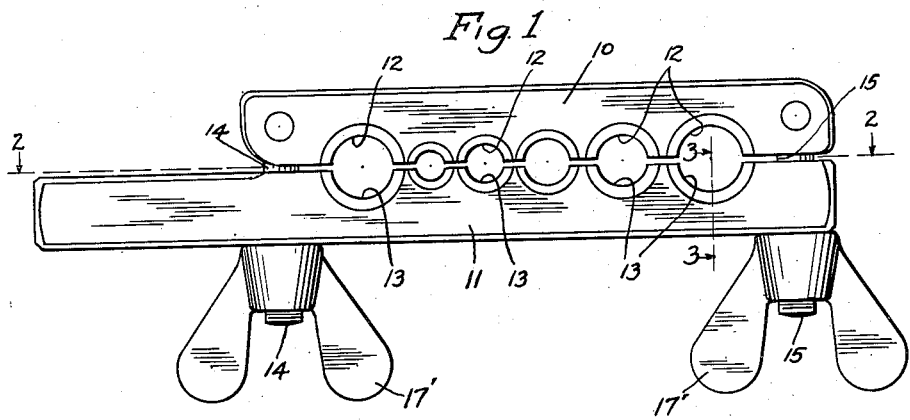
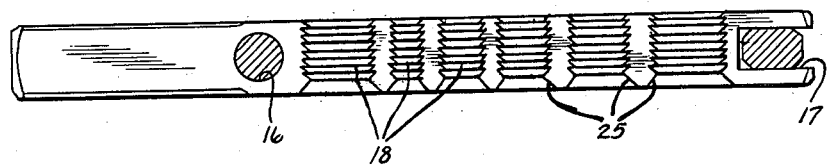
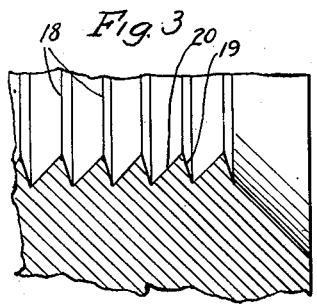
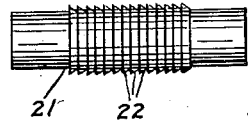
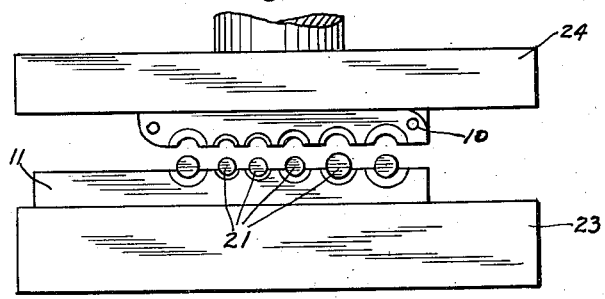
Inventor
Walter C. Alvin
By
Critton, Schroeder, Merriam & Hofgren
his Attorneys Patented Jan. 25, 1949

2,459,910

UNITED STATES PATENT OFFICE 2,459,910

METHOD OF MAKING TOOL PARTS

Walter C. Alvin, Chicago, Ill., assignor to The Imperial Brass Manufacturing Company, Chicago, Ill., a corporation of Illinois Application February 23, 1946, Serial No. 649,579

5 Claims. (Cl. 76—101)

The invention relates generally to a tube gripping tool part, more particularly, to the tube gripping members of a flaring, a flanging or a swaging tool and to the method of making the same.

One object of the invention is to provide tube gripping members having new and improved means for holding the tube against loss from between the members during operation of the tool on the tube.

Another object is to provide tube gripping members having cooperating, semicylindrical grooves formed in the members and having in each groove a plurality of thread-like ridges or serrations, the cross sectional shape serving to engage and hold the tube against axial movement in an improved and more effective manner.

Still another object is to provide grooved tube gripping members with each groove having formed therein a plurality of circumferentially extending, thread-like ridges or serrations having at least one face which forms a small angle with the perpendicular to the axis of the groove and having that face disposed in a direction generally opposite to the direction in which the tube tends to move while being operated upon by the tool.

A further object is to provide a new and improved, more expedient and more economical method of making tube gripping parts of a tool.

Still a further object is to perfect an expedient method of making the tube gripping parts of a tool wherein the serrations in the tube receiving grooves of the parts are formed by swaging.

Yet a further object is to provide a new and improved method of making the tube gripping bars of a tool in which a plurality of semicylindrical tube receiving grooves of different diameters are simultaneously formed in a single broaching operation, and in which tube engaging serrations are simultaneously formed in all of the grooves of a pair of cooperating bars in a single operation in which the serrations are swaged into the bars.

Other objects and advantages will become apparent from the following detailed description taken in connection with the accompanying drawings, in which:

Figure 1 is a side view of tube gripping bars embodying the features of this invention.

Fig. 2 is a sectional view taken along the line 2—2 of Fig. 1, showing in elevation the grooved edge of one of the bars of Fig. 1.

Fig. 3 is a section taken approximately along the line 3—3 of Fig. 1 and very substantially enlarged to show the shape of the ridges or serrations.

Fig. 4 is an elevational view of one of the rollers employed in the method of making the bars.

Fig. 5 is a diagrammatic view illustrating a step in the method.

While the invention is susceptible of various modifications in structure or method, it will hereinafter be disclosed in a preferred structure, a preferred method, and one modification of the method. It is not intended, however, that the invention is to be limited thereby to the specific disclosures made. On the contrary it is intended to cover all modifications and alternative constructions or methods falling within the spirit and scope of the invention as defined in the appended claims.

As already indicated, the invention relates to tube gripping members or parts of a tool such as a flaring, a flanging or a swaging tool and to the method of making the same. While such tube gripping parts may take various shapes, the invention will for purposes of disclosure be herein shown as embodied in and practiced upon tube gripping means wherein the cooperating members take the form of elongated bars 10 and 11. In a tool of this character the bar 11 is usually made longer than the bar 10 to provide a convenient hand grip. Conventionally and as herein shown, the bar 10 has formed in one edge thereof a plurality of, herein six, semicylindrical grooves or recesses 12 each of a different diameter so as to accommodate a tube of different outside diameter. Similarly, the bar 11 also has formed in one edge an equal number of semicylindrical grooves or recesses 13 corresponding in diameter to the diameter of the grooves 12 and, of course, also arranged in the same sequence so that grooves of corresponding diameter will be disposed opposite each other when the bars are placed with the grooved edges adjacent. Some convenient means is provided for drawing the bars tightly together to clamp or grip a tube in the grooves and to permit ready separation of the bars for the insertion and the subsequent withdrawal of the tube. By way of example, this means may take the form of a pair of bolts 14 and 15 pivotally connected one to each end of the bar 10. The bar 11 is near one end formed with a bore 16 through which the bolt 14 passes while at the other end the bar 11 is formed with a slot 17 opening through the end of the bar for reception of the bolt 15 by a swinging movement thereof. Both the bolt 14 and the bolt 15 carry wing nuts 17' which are readily tightened or loosened by the mechanic to cause the bars firmly to grip a tube or to permit the bolt 15 to be swung out of the slot 17 and the bar 11 swung about the pivoted end of a bolt 14 to open the bars for reception or removal of a tube.

In the manufacture of these tube gripping members, the first step is, of course, the production of members of the desired shape be they bars, as herein disclosed, or members of any other configuration, such as squares, hexagons, and the like. The next step is the formation of the semicylindrical grooves or recesses 12 and 13. Herein this is speedily and efficiently accomplished by broaching. Moreover, all of the recesses in either bar are broached simultaneously and, in fact, all of the recesses of a plurality of bars are broached simultaneously and in a single stroke of the broaching tools.

During the operations performed upon a piece of tube while being held between the bars 10 and 11, a considerable force tending to push the tube out from between the bars is exerted on the tube. If any material slipping of the tube occurs, it means, of course, that the desired flange or flare or other enlargement or deformation of the tube desired is not obtained. It becomes imperative, therefore, that means be provided for engaging the tube in a manner firmly to hold the tube against slipping while at the same time producing no, or at least a minimum, marring of the surface of the tube. To that end, each of the grooves 12 and 13 is herein provided with thread-like ridges or serrations 18 extending circumferentially and having a new and improved cross sectional shape. As best seen in Fig. 3, the thread-like ridges or serrations 18 are triangular in cross section and have faces 19 and 20 of different width and particularly of different inclination with respect to the perpendicular to the axis of the groove. More particularly, the face 19 makes a very small angle with the perpendicular to the axis of the groove, being on the order of 15°. This face, moreover, faces generally in a direction opposite to the direction of the force tending to cause the tube to move axially out of the grooves. The face 20 of each ridge or serration has a much larger inclination with respect to the perpendicular to the axis of the groove and herein forms an angle with the perpendicular to the axis of the groove in the order of 52°. The serrations 18 are so spaced axially of the groove that if they were true threads they would have a pitch of 32. Their dimension from apex to base is in the order of .02 of an inch. When constructed in this manner, the serrations are unusually effective in holding a tube in position for, because of the inclination of the face 19, any tendency of the tube to slip results in a digging into the tube by the serrations rather than a burnishing which results more and more as the inclination of the face 19 to the perpendicular to the axis of the groove increases. At the same time, the much larger inclination of the face 20 assures sufficient stock behind the serrations to provide the necessary strength.

The thread-like ridges 18 may be formed in several ways. In the preferred manner these ridges are swaged into the grooves. To that end, a roller 21, shown in Fig. 4, is employed. This roller is provided intermediate its ends with serrations 22 of the same cross section as the serrations desired to be formed in the grooves, as more particularly described above. The roller, of course, is made very tough and hard so as to be capable under high pressure of cutting into the bars 10 and 11 and shaping the surfaces of the groove to have the thread-like ridges or serrations 18 above described. It will be appreciated, of course, that a roller of appropriate diameter is provided for the various grooves and that the resulting ridges 18 are perfectly perpendicular to the axis of the groove and do not spiral as in the case of conventional threads. Preferably, though not necessarily, the ridges 18 are formed in cooperating grooves by one and the same roller and even at one and the same time. To that end, this step of the method is carried out by placing one bar on the bed of a hydraulic press and mounting the other bar on the movable ram of the press, and then placing the roller 21 between the two bars. As the ram moves downwardly to urge the one bar toward the other, the roller 21 will, of course, be interposed between the two bars and under high pressure will cut into the surface of the groove and produce serrations 18 of the desired shape.

Where, as herein, the bars 10 and 11 have the grooves 12 and 13 formed in one side only of the bar, all of the grooves may have the thread-like ridges or serrations 18 swaged therein at one and the same time and in one and the same operation of the press.

Thus, as illustrated in Fig. 5, the bar 11, for example, may be placed on the bed 23 of the hydraulic press and the bar 10 may be mounted on the movable head or ram 24. Inserted between the bars to register one with each of the pairs of openings are a plurality of the rollers 21 varying in diameter and appropriately arranged so as to register with the grooves of corresponding diameter. After the serrations 18 have been swaged into the bars, the bars are preferably kept assembled in pairs to retain the advantage that results from having opposed grooves serrated by one and the same roller.

In the alternative, the grooves may be tapped and the ridges 18 formed in that manner. When tapped, the ridges 18, will, of course have spiral-like, conventional threads but the cross sectional shape of the ridges will be the same as that produced by means of the rollers 21.

The bars 10 and 11 herein shown are adapted for use with a flaring tool and to that end each of the grooves is countersunk as at 25. The groove will, of course, be countersunk at the end toward which the faces 19 face, for naturally during a flaring operation the tube has a tendency to shift away from the countersunk end of the groove. It will be understood that the bars may be given further treatments such as hardening, plating, or the like, which steps, however, are conventional and form no particular part of this invention.

It is believed apparent from the foregoing that I have not only perfected a tube gripping means of improved construction but, in particular, have perfected a method of producing such tube gripping means with much greater facility, efficiency, and hence at greatly reduced cost. While this holds true regardless of whether the gripping means be adapted to secure a tube of one size only, and regardless of the fact that the gripping means may take configurations other than that of a pair of elongated bars, it is particularly true where, as here, a plurality of grooves are employed and are all formed on one side of the bars so that all may have their serrations rolled therein in one and the same operation.

I claim as my invention:

1. The method of making the tube gripping members of a flaring tool or the like comprising the steps of generally shaping a pair of cooperating tube gripping members, forming a semicylindrical groove in each member, placing in the grooves of the members between the members a cylindrical die having circumferential thread-like grooves and ridges one face of which forms a small angle with the perpendicular to the axis of the die, and forcing the members together to cause the die to form thread-like ridges in the semicylindrical grooves.

2. The method of making the tube gripping members of a flaring tool or the like comprising the steps of generally shaping a pair of cooperating tube gripping members, forming a semicylindrical groove in each member, placing in the grooves of the members between the members a cylindrical die having circumferential thread-like grooves and ridges with one face of each groove forming an angle of approximately 15° with the perpendicular to the axis of the die, and forcing the members together to cause the die to form thread-like ridges in the semicylindrical grooves.

3. The method of making the tube gripping members of a flaring tool or the like comprising the steps of generally shaping a pair of cooperating members, forming a semicylindrical groove in each member, placing a roller formed with ridges of the character desired in the grooves of the members between the members, and forcing the members together to cause the roller while held stationary to make thread-like ridges in the grooves.

4. The method of making the tube gripping bars of a flaring tool or the like comprising the steps of providing a pair of bars, forming in each bar a plurality of semicylindrical grooves each of a different diameter, placing the bars with the grooves of corresponding diameter opposite one another, inserting between the bars and within each cooperating pair of grooves a roller of a diameter conforming to the diameter of the particular grooves in which the roller is inserted, each roller being formed with circumferential thread-like ridges, and forcing the bars together to cause the rollers to form thread-like ridges in all the grooves simultaneously.

5. The method of making the tube gripping bars of a flaring tool or the like comprising the steps of providing a pair of bars, broaching into each bar a plurality of semicylindrical grooves each of a different diameter, placing the bars with the grooves of corresponding diameter opposite one another, inserting between the bars and within each cooperating pair of grooves a roller of a diameter conforming to the diameter of the particular grooves in which the roller is inserted, each roller being formed with circumferential thread-like ridges, and forcing the bars together to cause the rollers to form thread-like ridges in all the grooves simultaneously.

WALTER C. ALVIN.

REFERENCES CITED

The following references are of record in the file of this patent:

UNITED STATES PATENTS

| Number | Name | Date |
| --- | --- | --- |
| 448,904 | Yorke | Mar. 24, 1891 |
| 791,374 | Shepardson | May 30, 1905 |
| 1,114,158 | Lovell | Oct. 20, 1914 |
| 1,343,548 | Branin | June 15, 1920 |
| 1,579,308 | Graham | Apr. 6, 1926 |
| 1,721,689 | Christian | July 23, 1929 |
| 1,724,697 | Dobrick | Aug. 13, 1929 |
| 1,760,675 | Wadsten | May 27, 1930 |
| 1,834,316 | McLogan | Dec. 1, 1931 |
| 1,836,680 | Nixon | Dec. 15, 1931 |
| 1,986,025 | Stecher | Jan. 1, 1935 |